(12) United States Patent
Mohan et al.

(10) Patent No.: US 11,474,992 B2
(45) Date of Patent: Oct. 18, 2022

(54) DOMAIN NAME REGISTRATION AND MANAGEMENT

(71) Applicant: Afilias Limited, Dublin (IE)

(72) Inventors: Cedarampattu Mohan, Horsham, PA (US); Jimmy Lam, Toronto (CA); Hui Zhou, Toronto (CA); James Galvin, Horsham, PA (US); Michael Runcieman, Toronto (CA); Howard Eland, Horsham, PA (US)

(73) Assignee: AFILIAS LIMITED, Dublin (IE)

( * ) Notice: Subject to any disclaimer, the term of this patent is extended or adjusted under 35 U.S.C. 154(b) by 0 days.

(21) Appl. No.: 16/789,148

(22) Filed: Feb. 12, 2020

(65) Prior Publication Data
US 2020/0257674 A1    Aug. 13, 2020

Related U.S. Application Data

(63) Continuation of application No. 15/141,700, filed on Apr. 28, 2016, now Pat. No. 10,599,632.

(51) Int. Cl.
*G06F 16/23* (2019.01)
*G06F 16/27* (2019.01)
(Continued)

(52) U.S. Cl.
CPC .......... *G06F 16/2358* (2019.01); *G06F 16/27* (2019.01); *G06Q 10/00* (2013.01);
(Continued)

(58) Field of Classification Search
CPC ..... G06F 16/2358; G06F 16/27; G06Q 10/00; G06Q 10/101; H04L 61/1511; H04L 61/302; H04L 65/1073; H04L 61/4511
See application file for complete search history.

(56) References Cited

U.S. PATENT DOCUMENTS

2002/0083030 A1    6/2002  Yang et al.
2002/0184255 A1    12/2002 Edd et al.
(Continued)

FOREIGN PATENT DOCUMENTS

CA    2 600 790 A1    3/2008
CN    101980194 A    2/2011
(Continued)

OTHER PUBLICATIONS

Internationalized Domain Name FAQ, 2 pages, Oct. (Year: 2012).*
(Continued)

*Primary Examiner* — Albert M Phillips, III
(74) *Attorney, Agent, or Firm* — Haynes and Boone, LLP

(57) ABSTRACT

A method for synchronizing management of a plurality of domain names in a Domain Name System (DNS). The method comprises the following steps: receiving a request from a domain name registrant for an action as an operation on an object unique to a domain name of the DNS, the domain name having synchronized objects with another domain name being stored as a domain name bundle including the domain name in a domain name database; changing the object in the domain name database according to the action; identifying the another domain name in the domain name bundle; requesting a change to a corresponding object to the object for the another domain name with the action in order to propagate the operation performed on the object to the corresponding object, the corresponding object being unique to the another domain name; and forwarding a reported result of the action to the domain name registrant, the object and the corresponding object representing the synchronized objects by having the same parameter value, an owner to all domain names in the domain name bundle being the domain name registrant.

37 Claims, 3 Drawing Sheets

(51) Int. Cl.
    *G06Q 10/00* (2012.01)
    *G06Q 10/10* (2012.01)
    *H04L 61/4511* (2022.01)
    *H04L 61/3015* (2022.01)

(52) U.S. Cl.
    CPC ......... *G06Q 10/101* (2013.01); *H04L 61/302*
        (2013.01); *H04L 61/4511* (2022.05)

(56) References Cited

U.S. PATENT DOCUMENTS

| | | | |
|---|---|---|---|
| 2003/0115150 A1* | 6/2003 | Hamilton | G06Q 20/382 |
| | | | 705/64 |
| 2006/0206538 A1* | 9/2006 | Veazey | G06F 16/2358 |
| 2014/0006641 A1 | 1/2014 | James et al. | |
| 2015/0188883 A1 | 7/2015 | Xie et al. | |
| 2017/0316044 A1 | 11/2017 | Cedarampattu et al. | |

FOREIGN PATENT DOCUMENTS

| | | |
|---|---|---|
| CN | 102984299 A | 3/2013 |
| CN | 103501358 A | 1/2014 |
| CN | 103763133 A | 4/2014 |
| CN | 104660724 A | 5/2015 |
| CN | 104954505 A | 9/2015 |
| EP | 2680543 A2 | 1/2014 |
| EP | 3239906 A1 | 11/2017 |
| WO | 2014/14147587 A1 | 9/2014 |

OTHER PUBLICATIONS

RFC 5730—Extensible Provisioning Protocol (EPP), pp. 1-68, Aug. (Year: 2009).*
Database design for mere mortals pp. 1-10 (Year: 2013).*
U.S. Appl. No. 16/789,171, filed Feb. 12, 2020, Lam et al.
European Patent Office, Extended European Search Report for EP Application No. 17168787.4, dated Sep. 11, 2017, 6 pages.

* cited by examiner

DOMAIN NAME REGISTRATION AND MANAGEMENT

CROSS-REFERENCE TO RELATED APPLICATIONS

This application is a continuation of U.S. patent application Ser. No. 15/141,700, filed Apr. 28, 2016, now allowed, which is incorporated herein by express reference thereto in its entirety.

FIELD

The present invention is related to registration and management of domain names.

BACKGROUND

Domain names are used in various networking contexts and application-specific naming and addressing purposes. In general, a domain name represents an Internet Protocol (IP) resource, such as a personal computer used to access the Internet, a server computer hosting a web site, or the web site itself or any other service communicated via the Internet. In 2014, the number of active domains reached 271 million. Today's Internet presence by companies is considered a critical element of their business.

There are a number of good reasons for having a domain name. If you ever change your web host, your domain name goes with you. Your regular visitors or customers who knew your site name would not have to be informed about a change of web address (also known as "URL"). They would simply type your domain name and they'd be brought to your new site. If you are a business, a domain name gives you credibility. Few people will be willing to do business with a company that does not have its own domain name. If you get a domain name that describes your company's business or name, people can remember the name easily and can return to your site without having to consult their documents.

Registering with a domain name registrar allows a registrant to make sure that they are registered as the owner, the administrative and technical contacts. Being the owner is vital—if someone else places himself as the owner (such as your web host), he can always decide to charge you some exorbitant fee for the use of the name later. As such obtaining and retaining proper rights to a registrant's domain name portfolio is key in today's competitive landscape.

It is a disadvantage with the current domain name registration and management systems that a registrant's plurality of domain names must be individually registered and subsequently individually maintained (e.g. renewals, etc.). It is critical that registry information relating to the various domain names of a registrant be complete, consistent, accurate, and up to date. As such, it is critical that the domain name registrant keep their domain name records up to date to prevent undesirable expense, complication and worst-case loss of domain name rights. The coordination involved by the registrant in today's multi-TLD universe is becoming increasingly complex, due to the increased availability in the number and variety of domain names.

SUMMARY OF THE INVENTION

The present invention provides a system and method for domain names to obviate or mitigate at least some of the above presented disadvantages.

A first aspect provided is a method for synchronizing registration of a plurality of domain names in a Domain Name System (DNS), the method comprising the steps of: receive a request from a domain name registrant for an action as a registration operation on an object unique to a domain name of the DNS, the domain name having synchronized objects with another domain name being stored as a domain name bundle including the domain name in a domain name database; change the object in the domain name database according to the action; identify the another domain name in the domain name bundle; request a change to a corresponding object to the object for the another domain name with the action in order to propagate the operation performed on the object to the corresponding object, the corresponding object being unique to the another domain name; and forward a reported result of the action to the domain name registrant, the object and the corresponding object representing the synchronized objects by having the same parameter value, an owner to all domain names in the domain name bundle being the domain name registrant.

A second aspect provided is a method for synchronizing management of a plurality of domain names in a Domain Name System (DNS), the method comprising the steps of: receive a request from a domain name registrant for an action as a management operation on an object unique to a domain name of the DNS, the domain name having synchronized objects with another domain name being stored as a domain name bundle including the domain name in a domain name database; change the object in the domain name database according to the action; identify the another domain name in the domain name bundle; request a change to a corresponding object to the object for the another domain name with the action in order to propagate the operation performed on the object to the corresponding object, the corresponding object being unique to the another domain name; and forward a reported result of the action to the domain name registrant, the object and the corresponding object representing the synchronized objects by having the same parameter value, an owner to all domain names in the domain name bundle being the domain name registrant.

BRIEF DESCRIPTION OF THE DRAWINGS

Exemplary embodiments of the invention will now be described in conjunction with the following drawings, by way of example only, in which.

DETAILED DESCRIPTION OF PREFERRED EMBODIMENTS

Figure 1:
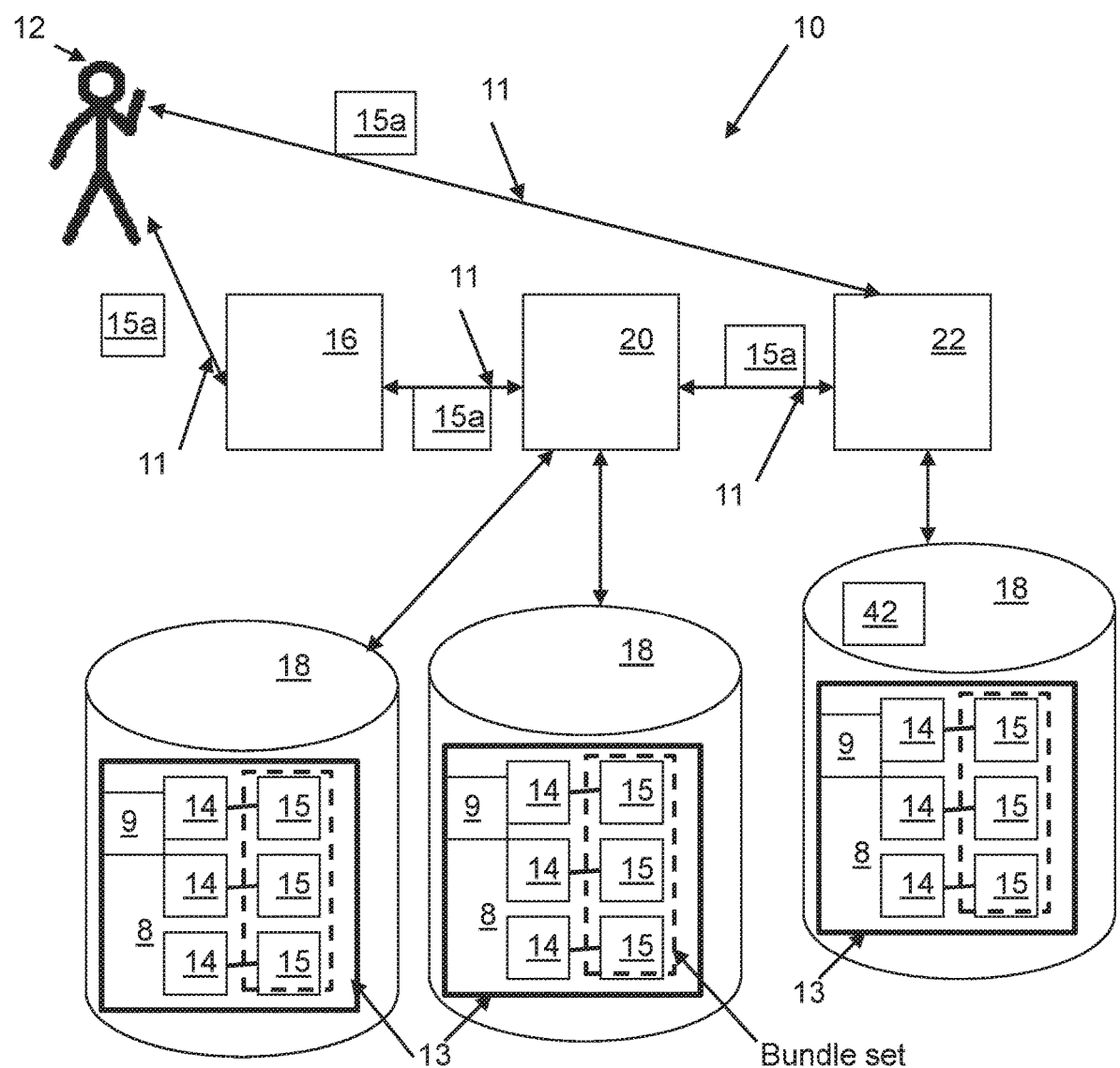
FIG. 1 is a block diagram of components of a domain name registration and maintenance system.

Referring to FIG. 1, shown is a domain name registration and implementation system 10 providing for a domain name registrant 12 (e.g. domain owner) to request and obtain over a communications network 11 (i.e. the Internet) a bundle 13 of domain names 14 from a domain name registrar 16 for multiple domain names 14 (aggregated into the common bundle 13) available (e.g. not yet claimed) in a domain name registry database 18 (e.g. a database of all domain names registered in a top-level domain (TLD)), which can be managed by a registry operator 20 that also generates zone files which convert domain names to IP addresses.

As further described below, the domain name registration and implementation system 10 also facilitates management of a plurality of the domain names 14 considered members in the common bundle 13 via a set of synchronized objects 15 associated explicitly with the bundle 13 and thereby associated implicitly with each of the domain names 14 in the bundle 13. It is recognized that the domain names 14 in the bundle 13 can be distributed across more than one database 18, for example a portion of the domain names 14 of the bundle 13 stored in one database 18 while the remaining portion of the domain names 14 in the bundle 13 stored in a second database 18 separate from the first database 18. In any event, it is recognized that a bundle list 9 of all the domain names 14 present as members in the bundle 13 can be stored in one or more of the databases 18, such that the bundle list 9 is used to match any incoming requests 32,35 from the registrar for a particular domain name 14 to all other domain names 14 present in the bundle 13. It is also recognized that each of the domain names 14 can have associated with them a bundle ID 8 to indicate specific bundle membership, such that each domain name 14 is cross referenced with their respective bundle 13 by the bundle ID 8. As such, the database 18 can have a list of all bundles 13 contained, either in whole or in part, within the database 18 and identifiable as such by the bundle ID 8 (representing bundle 13 membership for a particular domain name 14) contained in the list of bundles 13.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. For example, the communications network 11 can also include Bluetooth™ associated elements. It is recognised that the domain name registrar 16, the registry operator 20 and the registry services provider 22 can be implemented on computer devices 100 (see FIG. 3) such as servers and can communicate with one another via the network 11 in client-server relationships.

Domain Names 14

A domain name 14 can be referred to as an identification string which is organized in subordinate levels (subdomains) of a DNS root domain, which is nameless. Each domain name 14 consists of one or more parts, technically called labels, that are conventionally concatenated, and delimited by dots, such as label3.label2.label1. The first-level set (e.g. label1) of domain names 14 are the top-level domains (TLDs), including the generic top-level domains (gTLDs), such as the prominent domains info, edu, and org, and the country code top-level domains (ccTLDs). Below these top-level domains in the DNS hierarchy are the second-level (e.g. label2) and third-level (e.g. label3) domain names 14 that are typically open for reservation by end-users who wish to connect local area networks to the Internet 11, create other publicly accessible Internet resources, or run web sites. The registration of these domain names 14 can be administered by the domain name registrars 16, who sell their services to the public. The hierarchy of domains descends from the right to the left label in the domain name 14; each label to the left specifying a subdivision, or subdomain of the domain to the right.

For example, the top-level domains (TLDs) such as .info and .org are the highest level of domain names of the Internet 11, whereby top-level domains form the DNS root zone of the hierarchical Domain Name System, such that every domain name 14 ends with a top-level domain label. In terms of the bundle 13 as a specific collection of domain names 14, each of the domain names 14 has a series of parent-child pairings for the labels, e.g. for the example domain name 14 label3.label2.label1-label3 is the parent of label2 as the child, label2 is the parent of label1 as the child, whereby one of the labels in the pairing is allowed to vary while the other of the labels in the pairing remains constant. In other words, an example bundle 13 of domain names 14 could be such as but not limited to: a set of Top Level Domains (TLDs) of the same second level domain (e.g. label2.a, label2.b, label2.c such that "a", "b", "c" are different versions of label1); a set of second level domains (SLDs) of the same third level domain (e.g. label3.a.label1, label3.b.label1, label3.c.label1 such that "a", "b", "c" are different versions of label2); a set of Top Level Domains (TLDs) of different second level domains (e.g. a.label1, b.label1, c.label1 such that "a", "b", "c" are different versions of label2); a set of second level domains (SLDs) of different third level domains; and/or lower level domains (e.g. a.label2.label1, b. label2.label1, c. label2.label1 such that "a", "b", "c" are different versions of label3). It is also recognize that an example bundle 13 of domain names 14 can be represent as having all domain levels differ, for example domain name label3.label2.label1 such that each of the label3, label2, label1 are different (i.e. there are no common or constant labels between each of the domain names 14 in the bundle 13 (e.g. bundle 13 comprised of domains a.b, c.d, e.f, etc.)

The registration of these domain names 14 is administered by domain name registrars 16 who sell their services to the public (i.e. registrants 12). The TLD names 14 such as .info, .org, .mobi are the highest level of domain names of the Internet 11. Top-level domains form a DNS root zone of a hierarchical Domain Name System implemented on the Internet 11. Every domain name 14 ends with a top-level domain label. Below the top-level domains in the domain name hierarchy are the second-level domain (SLD) names 14. These are the names directly to the left of the top-level domains. As an example, in the domain example.co.info, co is the second-level domain. Second-level domains commonly refer to an organization (e.g. registrant 12) that registered the domain name 14 with the domain name registrar 16. Some domain name registry operators 20 introduce the second-level hierarchy to the TLD that indicates a type of entity intended to register an SLD under it, for example, in the .org namespace a college or other academic institution could register under the .ac.info ccSLD, while companies could register under .co.info. Next are third-level domain names 14, which are written immediately to the left of the second-level domain, recognising that there can be fourth- and fifth-level domains, and so on, with virtually no limitation. As such, it is recognised that the domain name bundle 13 can contain multiple domain names 14 considered as a single group of domain names having common synchronized objects with one another to facilitate management of each of the domain names 14 in the domain name bundle 13, as further described below. One example of a domain name bundle 13 could be a grouping of TLDs associated with color, e.g. .red, .orange, .blue, .green, etc.

Domain names 14 can be referred to as domains and domain name registrants 12 can be referred to as domain owners, although domain name registration with the registrar 16 may not confer any legal ownership of the domain name 14, only an exclusive right of use for a particular duration of time. As such, the domain name 14 can be considered an economic asset utilized as an identification string defining a realm of administrative autonomy, authority or control within the Internet 11. The domain names 14 are formed by the rules and procedures of the Domain Name System (DNS), such that any name registered in the DNS is a domain name 14. Domain names 14 can also be thought of as a location on the Internet 11 where certain information or activities can be found. A fully qualified domain name (FQDN) is a domain name 14 that is completely specified in the hierarchy of the DNS, having no parts omitted.

In terms of importance to functioning of the Internet 11 for searching for and accessing Internet 11 resources, domain names 14 serve as names for these Internet 11 resources such as computers, networks, and services. The domain name 14 represents an Internet Protocol (IP) resource and specifically, individual Internet host computers use domain names 14 as host identifiers, or host names (e.g. leaf labels in the domain name system usually without further subordinate domain name space). Of importance to Internet 11 navigation, host names appear as a component in Uniform Resource Locators (URLs) for Internet 11 resources such as web sites (e.g., Afilias.info). Domain names 14 can also be used as simple identification labels to indicate ownership or control of a resource. Such examples are the realm identifiers used in the Session Initiation Protocol (SIP), the Domain Keys used to verify DNS domains in e-mail systems, and in many other Uniform Resource Identifiers (URIs). An important function of domain names 14 is to provide easily recognizable and memorizable names to numerically addressed Internet 11 resources. Usability of the domain names 14 as an abstraction provides any resource to be moved to different physical locations in the address topology of the network 11, globally or locally in an intranet. Such a move usually involves changing the IP address of the resource and the corresponding translation of this IP address to and from its domain name 14.

Referring again to FIG. 1, the registry operator 20 can also interact with the registry services provider 22 responsible for services/capabilities facilitating smooth and efficient operation of any type of domain registry database 18. For example, the registry services provider 22 can provide to the registry operator 20 a standards-based, EPP registry system facilitating a reliable, secure platform for domain operations. Further, the registry services provider 22 can provide a distributed DNS system facilitating domain availability on the Internet 11 coupled with provision of state of the art security against attack and abuse. Further, the registry services provider 22 can provide launch or improvement assistance for the domains identified by the domain names 14 of the domain name bundle 13. Further, the registry services provider 22 can provide registry solutions and accommodate policy needs for the domain. It is also recognized that the registry services provider 22 can implement all or a subset of the registry functionality and support services on behalf of the registry operator 20 (for example the registry services provider 22 can be the registry operator 20 for a selected domain name bundle 13).

Registration and maintenance of domain names 14 in the domain name bundle 13 involves management of synchronized objects 15 associated with each of the domain names 14 in the domain name bundle 13. These objects 15 are populated with appropriate data based on action(s) performed on the objects 15 (e.g. update/modification, delete/del, transfer, renew, etc.). Example actions on the objects 15 for the domain name bundle 13 are such as registration/purchase of the domain names 14 as the bundle 13 by the registrant 12 from the registrar 16. Other example actions on the objects 15 can include management by the Registry Operator 20 of up-to-date data in the objects 15 concerning domain name and name server registrations maintained by the Registry Operator 20, useful in verifying and providing operational stability of Registry Services and the DNS.

Example Objects 15

The specification of the content and format of this data of the objects 15 can be such as but not limited to:
1. Registrar Objects.
 The registrar object corresponds to a single registrar. It includes the following data:
 Registrar ID (conforming to the IANA registrar-ids registry)
 Contact ID of Registrar
 Registrar Administrative Contacts
 Registrar Technical Contacts
 Registrar Billing Contacts
 Registrar URL
 Registrar Creation Date
 Registrar Last Updated Date
2. Contact Objects.
 The contact object corresponds to a single contact (whether registrant, administrative, technical or billing contact). The contact object includes the following data:
 Contact ID
 Contact Name
 Contact Organization
 Contact Address, City, State/Province, Country
 Contact Postal Code
 Contact Phone, Fax, E-mail
3. Nameserver Objects.
 A nameserver object corresponds to a single registered nameserver. The nameserver object includes the following data:
 Name Server ID
 Name Server Host Name
 Name Server IP Addresses if applicable
 Current Registrar
 Name Server Creation Date
 Name Server Last Updated Date
4. Domain Objects.
 The domain object corresponds to a single Registered Name. Each domain object includes the following data:
 Domain ID
 Domain Name
 Sponsoring Registrar
 Domain Status
 All contact information (including all details) with at least one each of:
  Registrant
  Administrative
  Technical
  Billing
 All nameservers associated with this domain
 Domain Registration Date
 Domain Expiration Date
 Domain Last Updated Date It is recognized that registrant 12 itself can communicate directly with the registrar 16, the Registry Operator 20 and/or the registry services provider 22 for registration and/or maintenance information 26 (see FIG. 2) used in registration and maintaining of the domain names 14 associated with the bundle 13 via coordinating the data content of the synchronized objects 15, and/or can communicate registration and/or maintenance information 26 indirectly with registry services provider 22 via registry operator 20.

Further, registry operator 20 can supply any requested registration and/or maintenance information 26 to registry services provider 22 on behalf of registrant 12. As such, the registration and/or maintenance information 26 is considered data used to populate the synchronized objects 15 based on actions (e.g. update, delete, transfer, renew, etc.) performed on the synchronized objects 15.

Example Actions

An action is defined as an operation on an object 15 unique to each of the plurality of domain names 14 of the DNS, realizing that each of the plurality of the domain names 14 in their bundle 13 has the same data contents in their object 15 as is in a corresponding object 15 associated with another domain name 14 of the bundle 13, thus providing for synchronized objects 15 of the bundle 13. An example action can be assigning the domain names 14 of the domain name bundle 13 to a new domain name registrant 12. Alternative actions for existing bundles 13 can include actions such as but not limited to check, info/status, update/mod, delete/del, transfer, and/or renew.

The action can be based on a protocol such as Extensible Provisioning Protocol (EPP) or Registry Registrar Protocol (RRP). The Extensible Provisioning Protocol (EPP) is a flexible protocol designed for allocating objects within registries over the Internet. EPP provides a robust and flexible protocol that facilitates transaction communications between domain name registry service providers 22 and domain name registrars 16. These transactions are used whenever a domain name 14 is acted upon using actions such as to effect data content of the domain name objects 15 to reflect registered, transferred, renewed or otherwise amended domain names 14. As such, the EPP protocol is used to implement an order (request action on an object) and fulfilment (perform and report result of object when acted upon) system. Specified in XML, EPP provides four basic service elements: a greeting, commands (e.g. actions), responses (e.g. to the actions effecting changes to data content of the objects 15 associated with the actions), and an extension framework that supports future definition of managed objects 15 and the relationship of EPP protocol requests (e.g. actions) and responses to those objects 15. It is recognised that actions of EPP are expressed as XML, a structured, text-based format, such that communication over the network 11 of the actions between entities 16,18,20,22 can be specified over TCP communication messaging and/or other transport communication messaging such as BEEP, SMTP, or SOAP.

The registry databases 18 can also contain a transaction log/history 42 (e.g. EPP) containing all operations (a consequence of actions) executed on the objects 15 of the domain names 14 in the bundle 13, such that the log/history 42 indicates the domain name 14 by domain name ID along with details of the operation(s) (e.g. time of transaction, success of transaction, type of operation, etc.). It is recognised, as further described below, in the event that a domain name 14 of the bundle 13 is removed (e.g. divided from the bundle 13 as originally set up) and/or a new domain name 14 is added to the bundle 13 post creation of the original bundle 13, the transaction log/history of the new/deleted domain name 14 will be indicated by the original domain name ID pre-change (pre division or pre addition) as well as a new domain name ID (assigned post-change) cross referenced to the old ID. It is recognised that the log/history 42 can also contain the bundle ID assigned to the domain name 14 (representing the current bundle 13 or previous bundle 13 in the case of a change in bundle 13 membership).

It is recognised that the entities 16,18,20,22 can interact on the network 11 with one another in client server pairs. For example, the registrar 16 can be the EPP client and the registry database 18 (with associated registry operator 20) can be the paired EPP server. In general, an EPP server responds to a successful connection by returning a greeting to the client. The client waits for the greeting before sending an EPP command (i.e. action) to the server. EPP commands and responses are exchanged serially between the client and the server over the network 11, in order to affect the data contents of the corresponding objects 15 that are acted upon by the action implemented by the server (i.e. as requested by the client). The server responds to each EPP command with a coordinated response that describes the results of processing the command.

EPP commands fall into three categories: session management commands, query commands, and data transform commands. Session management commands are used to establish and end sessions with an EPP server. Query commands are used to perform read-only, object-based information retrieval operations with respect to data contents of the objects 15. Transform commands are used to perform read-write object management operations with respect to the data contents of the objects 15.

EPP provides commands to manage sessions, retrieve object information, and perform transformation operations on objects. All EPP commands are atomic and idempotent, either succeeding completely or failing completely and producing predictable results in case of repeated execution. EPP provides three commands/actions to retrieve object information: action <info> to retrieve detailed information associated with a known object, action <ping> to determine if an object is known to the server, and action <transfer> to retrieve known object transfer status information. EPP provides five commands/actions to transform (i.e. modify the data contents of the object 15) objects 15: action <create> to create an instance of an object 15 with a server, action <delete> to remove an instance of an object 15 from a server, action <renew> to extend the validity period of an object 15, action <update> to change information associated with an object 15, and action <transfer> to manage changes in client sponsorship (e.g. change in registrant 12) of a known object 15. As such, instance of an object 15 refers to the specific data contents of an object 15. EPP uses four decimal digits to describe the success or failure of each EPP command. The four digits of the reply each have special significance. The first digit denotes whether the response submitted by the server back to the client marks command success or failure. A client that wants to know approximately what kind of error occurred (command syntax error, security error, system error, etc.) can examine the second digit. The third and fourth digits are used to provide explicit information detail by the server to the client with respect to the results of command execution and object 15 data contents change thereby.

Figure 2:
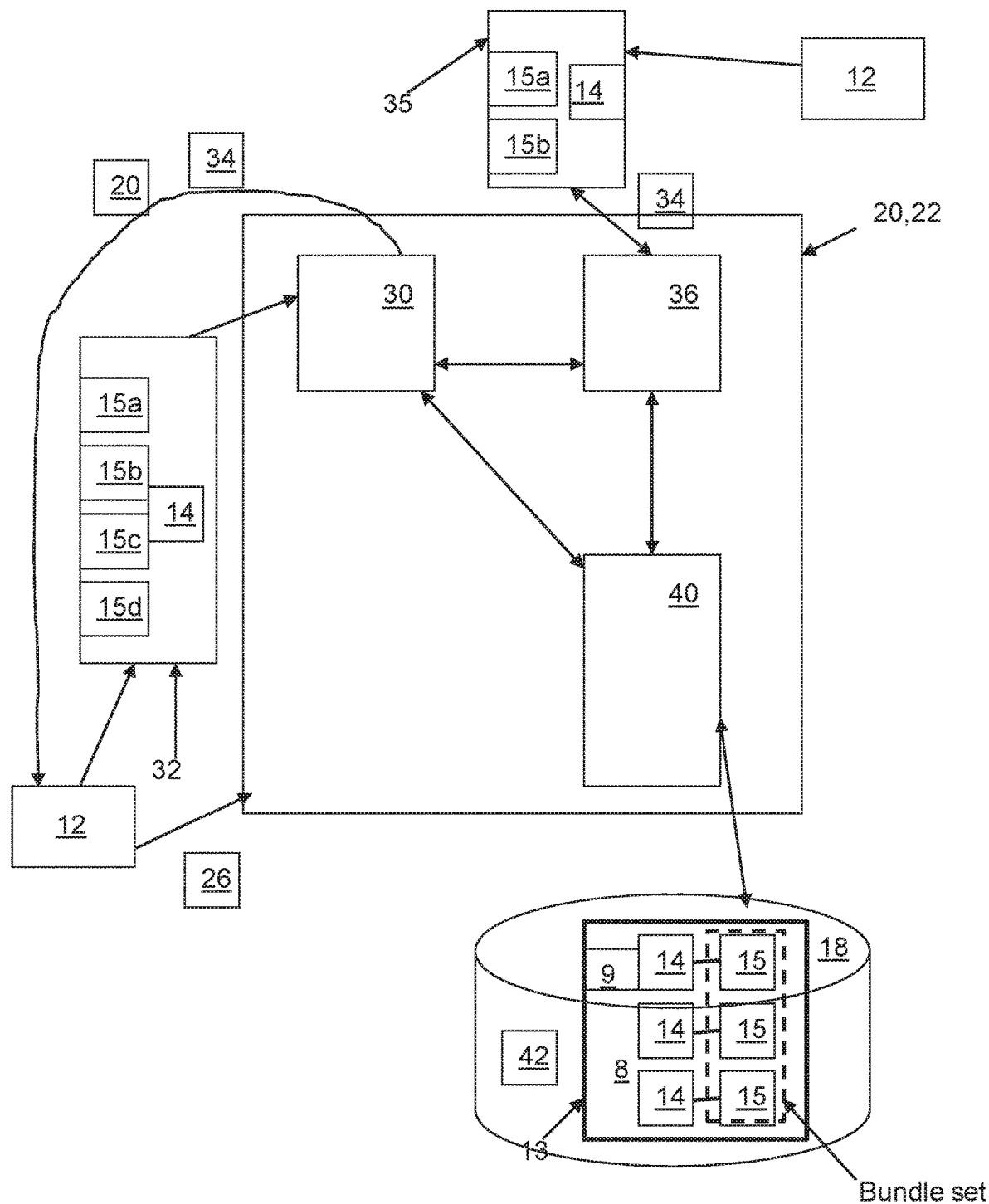
FIG. 2 is a block diagram of an example implementation for the system of FIG. 1.

Referring to FIGS. 1 and 2, shown are the registry services provider 22 and/or registry operator 20 responsible for the generation, initial registration with the registrant 12 and maintenance of the plurality of domain names 14 aggregated into the domain name bundle 13. As noted, the domain names 14 of the domain name bundle 13 are stored in the registry database 18. The domain names 14 represent Internet 11 resources (e.g. web pages, databases, etc.) accessible via a specified URI (over the network 11) incorporating the domain name 14 associated with the specified TLD maintained in domain name registry database 18 using an appropriate network communications protocol (e.g. TCP/IP, HTTP, HTTPS, etc.). For example, the network 11 communications protocol includes rules for data formats for data exchange and rules for network address formats for data exchange that identify both the sender network 11 address and the intended receiver(s) network 11 address. In computing, the URI is a string of characters used to identify a name or a resource. Such identification enables interaction with representations of the resource over a network (typically the World Wide Web) using the specific protocols. Schemes specifying a concrete syntax and associated protocols define each URI, such that URIs can be classified as locators (URLs), as names (URNs), or as both. A uniform resource name (URN) functions like a person's name, while a uniform resource locator (URL) resembles that person's street address. In other words: the URN defines an item's identity, while the URL provides a method for finding the item over the network 11.

From the point of view of a registrant 12 to the domain name bundle 13, the objects 15 associated with each of the domain names 14 in the bundle 13 can be perceived by the registrant 12 as a synchronized set of objects 15, such that requested changes/adjustments to the data contents of one object 15 type (e.g. registrant contact name, expiration date, etc.) by the registrant 12 for one domain name 14 in the bundle 13 is rigorously mapped and executed to a corresponding same object 15 type for all other domain names 14 in the bundle 13 as a result of receiving the registrant 12 request (i.e. command/action). Execution of the action contained in the registrant 12 request, to affect the objects 15 stored in the registry database 18 associated with the domain names 14 of the bundle 13, can be executed by the registry operator 20 and/or the registry services provider 22. It is recognized that the registry services provider 22 can also function as a registry operator 20 for selected domain names 14.

It is recognized that each of the domain names 14 in the bundle 13 have their own group of associated objects 15, such that each group of objects 15 in the bundle 13 are combined into a set of objects 15 for the bundle 13. For example, for a bundle 13 having three domain names 14, the set of objects 15 would have three domain name (type) objects 15, three registrant contact (type) objects 15, three creation date (type) objects 15, etc, such that each group of associated objects 15 would have one domain name (type) object 15, one registrant contact (type) object 15, one creation date (type) object 15, etc.

The objective of bundle 13 is to provide a synchronized registration and maintenance platform for a plurality of domain names 14 contained in the bundle 13. As such, it is recognized that actions taken on one object type for a selected domain name 14 of the bundle 13 is rigorously executed on all other same object types in the set of objects of the bundle 13. For registries focused on organizational registrations, the registry services provider 22 can offer effective and significant brand protection to registrant 12 (e.g. organization) of domain names 14 in the bundle 13. This is especially valuable to small and medium sized organizations, as well as organizations with limited resources to develop and manage a brand.

It is recognized that the registry services provider 22 provides or otherwise hosts the web pages made available to users of the network 11, in order to provide access to web-published content associated with the domain name of interest sought by the network user. For example, the web pages and associated content can be provided to the network 11 by the registry services provider 22 as files uploaded via File Transfer Protocol (FTP) or a Web interface of the network 11 (e.g. the Internet). The files representing the web pages can be delivered to the Web "as is" or with some processing. The web page(s) 24 for a domain name registrant 12 (e.g. domain owner) can be provided as a single page hosted or as a more complex series of pages and associated navigational links between the pages supported via the database and application development platforms (e.g. PHP, Java, Ruby on Rails, ColdFusion, or ASP.NET). However, it is recognized that the application development platforms, when pertaining to content of their web pages, inhibits the domain name registrant 12 (e.g. domain owner) from writing or installing scripts for applications like forums and content management published on the web pages, as further described below. As such, the registry services provider 22, for any content published on the web pages, provides none or limited interfaces or control panels to the domain name registrant 12 (e.g. domain owner) for managing the Web server and installing scripts, as well as other modules and service applications like e-mail, as the bundle 13 is perceived by the registrant 12 as facilitating and streamlining registration/maintenance of all of the domain names 14 in the bundle 13.

Further, it is recognized that registry services provider 22 can be embodied as separate from registry operator 20 (e.g. a third party cooperating with registry operator 20 via the network 11) or can be embodied as a service hosted (not shown) by registry operator 20 itself, as desired. Registry services provider 22 can be used to generate and maintain the bundle 13 on command/registration information 15*a,b, c,d* obtained from the registrant 12 directed to the registry operator 20 and/or registry services provider 22, as received via a registration module 30 as a registration request 32.

Example content of registration information 15*a,b,c,d* can include several pieces of information connected with the domain names 14 of the bundle 13, for example: 1) administrative contact information 15*a* (e.g. contact name, address, etc.) defining a designated an administrative contact to manage the domain names 14 as the bundle 13 including management of all business information, such as name of record, postal address, and contact information of the official registrant of the domain names 14 as the bundle 13 and the obligation to conform to the requirements of the domain registry operator 20 in order to retain the right to use the domain names 14 as the bundle 13, as well as installing additional contact information for technical and billing functions; 2) technical contact information 15*b* (e.g. contact name, address, etc.) defining a designated technical contact to manage the name server of the domain names 14 as the bundle 13 including assuring conformance of the configurations of the domain names 14 as the bundle 13 with the requirements of the domain registry service operator 20, maintaining the domain zone records, and providing continuous functionality of the name server (that leads to the accessibility of the domain names 14 as the bundle 13); 3) billing contact information 15*c* (e.g. contact name, address, etc.) defining a designated party responsible for receiving billing invoices from the domain name registrar 16 and paying applicable fees; and 4) name server information 15*d* (e.g. a hostname and the corresponding IP address or just the hostname, which must be resolvable either in the new domain names 14 as the bundle 13, or exist elsewhere) defining designated name server as part of the registration service, for example registrant 12 can specify its own authoritative name server to host the domain's resource records of the domain names 14 as the bundle 13. As registrant information 15*a,b,c,d* is received, it is provided to a bundle generation module 40 for use in generating the bundle 13 via population of all of the objects 15 contained in the set of bundle objects 15.

Referring again to FIG. 2, the registry operator 20 and/or registry services provider 22 can also have a command execution module 36 (provided as separate from the registration module 30 by example only). The command execution module 36 is configured to receive the actions from the registrant 12 in order to update the data contents of all of the related objects 15 (e.g. of the same type) contained in the set of bundle objects 15. For example, a command to update registrant contact details for one of the domain names (e.g. specified by domain name ID in the command) is executed by the command execution module 36 to affect the data contents of the relevant object 15 in the registry database 18 for the specified domain name 14, as well as similarly to affect the data contents of the relevant objects 15 in the registry database 18 for all other domain names 14 in the bundle 13 to which the specified domain name 14 belongs.

Example Registration of the Bundle 13

An example operation of the registration module 30 is as follows, referring to FIGS. 1 and 2, synchronizing registration of a plurality of domain names 14 in a Domain Name System (DNS) can be implemented by the registry operator 20 and/or registry services provider 22 by: receiving a request 32 by the registration module 30 from a domain name registrant 12 for an action as a registration operation on an object 15 unique to a domain name 14 of the DNS, the domain name 14 having synchronized objects 15 with another domain name 14 being stored as a domain name bundle 13 including the domain name 14 in a domain name database 18; changing the object 15 by the generation module 40 in the domain name database 18 according to the action; identifying the another domain name 14 in the domain name bundle 13 by inspecting a list of domain names contained in the bundle 13; requesting a change to a corresponding object 15 to the object 15 for the another domain name 14 with the action in order to propagate the registration operation performed on the object 15 to the corresponding object 15, the corresponding object 15 being unique to the another domain name 14; and forwarding via the registration module 30 a reported result 34 of the action to the domain name registrant 12, the object 15 and the corresponding object 15 representing the synchronized objects 15 by having the same parameter value, an owner to all domain names 14 in the domain name bundle 13 being the domain name registrant 12.

A further example operation of the registration module 30 is as follows, referring to FIGS. 1 and 2: receiving a subsequent request 32 from the domain name registrant 12 for a subsequent action as a subsequent registration operation on the object 15 unique to the domain name 14 of the DNS; changing the object 15 in the domain name database 18 according to the subsequent action; identifying the another domain name 15 in the domain name bundle 13; requesting a subsequent change to the corresponding object 15 for the another domain name 14 with the subsequent action in order to propagate the subsequent registration operation performed on the object 15 to the corresponding object 15; and forwarding a reported result 34 of the subsequent action to the domain name registrant 12.

A further example operation of the registration module 30 is as follows, referring to FIGS. 1 and 2: receiving a subsequent request 32 from the domain name registrant 12 for a subsequent action as a subsequent registration operation on a different object 15 unique to the domain name 14 of the DNS; changing the different object 15 in the domain name database 18 according to the subsequent action; identifying the another domain name 14 in the domain name bundle 13; requesting a subsequent change to the corresponding different object 15 for the another domain name 14 with the subsequent action in order to propagate the subsequent registration operation performed on the different object 15 to the corresponding different object 15; and forwarding a reported result 34 of the subsequent action to the domain name registrant 12.

A further example operation of the registration module 30 is as follows, referring to FIGS. 1 and 2: receiving a subsequent request 32 from the domain name registrant 12 for a subsequent action as a subsequent registration operation on the corresponding object 15 unique to the another domain name 14 of the DNS; changing the corresponding object 15 in the domain name database 18 according to the subsequent action; identifying the domain name 14 in the domain name bundle 13; requesting a subsequent change to the object 15 for the domain name 14 with the subsequent action in order to propagate the subsequent operation performed on the corresponding object 15 to the object 15; and forwarding a reported result 34 of the subsequent action to the domain name registrant 12.

A further example operation of the registration module 30 is as follows, referring to FIGS. 1 and 2: receiving a subsequent request 32 from the domain name registrant 12 for a subsequent action as a subsequent registration operation on a different corresponding object 15 unique to the another domain name 14 of the DNS; changing the corresponding different object 15 in the domain name database 18 according to the subsequent action; identifying the domain name 14 in the domain name bundle 13; requesting a subsequent change to a different object 15 for the domain name 14 with the subsequent action in order to propagate the subsequent operation performed on the corresponding different object 15 to the different object 15; and forwarding a reported result 34 of the subsequent action to the domain name registrant 12.

As discussed above, registry databases 18 can also contain the transaction log/history 42 containing all operations (a consequence of actions) executed on the objects 15 of the domain names 14 in the bundle 13, such that the log/history 42 indicates the domain name 14 by domain name ID along with details of the operation(s) (e.g. time of transaction, success of transaction, type of operation, etc.). In the event that a domain name 14 of the bundle 13 is removed (e.g. divided from the bundle 13 as originally set up) and/or a new domain name 14 is added to the bundle 13 post creation of the original bundle 13, the transaction log/history of the new/deleted domain name 14 will be indicated by the original domain name ID pre-change (pre division or pre addition) as well as a new domain name ID (assigned post-change) cross referenced to the old ID. It is recognised that the log/history 42 can also contain the bundle ID assigned to the domain name 14 (representing the current bundle 13 or previous bundle 13 in the case of a change in bundle 13 membership).

In terms of adding a new domain name to an existing bundle 13, the registration module 30 operates as follows, referring to FIGS. 1 and 2: receiving a subsequent request 32 from the domain name registrant 12 to add a specified domain name 14 to the existing bundle 13. As such, the registration module 30 (for example via the generation module 40) would update all of the objects of the new domain name 14 with the data contents of all of the synchronized objects 15 already in existence for the bundle 13 (receiving membership of the new domain name 14). As mentioned, the mention of the new domain name 14 in the transaction log 42 would be assigned a new ID (e.g. domain name ID, bundle ID 8) to replace the current ID of the domain name 14 in the transaction log 42, thereby reflecting the change in bundle 13 membership of the new domain name 14. It is recognised that in the case of adding the new domain name 14 to the bundle 13, it is feasible that some of the object 15 types may not be synchronized, for example the new domain name 14 can have a different creation date (creation data object 15 type) than the rest of the pre-existing domain names 14 of the bundle 13 or for example the new domain name 14 can have a different renewal date (renewal data object 15 type) than the rest of the pre-existing domain names 14 of the bundle 13. However, irrespective that some of the object 15 types in the set of bundle objects 15 can be unsynchronized, the owner (owner object 15 type) and contact details (registrant contact detail object 15 type) are synchronized for all associated objects 15 by same type in the set of bundle objects 15. It is recognised as well that the list 9 of domain names 14 would be updated with the new domain name ID and the new domain name 14 would assume the bundle ID 8 of the current bundle 13 to reflect change in bundle 13 membership.

In terms of deleting a domain name 14 from an existing bundle 13, the registration module 30 operates as follows, referring to FIGS. 1 and 2: receiving a subsequent request 32 from the domain name registrant 12 to delete a specified domain name 14 from the existing bundle 13. As such, the registration module 30 (for example via the generation module 40) would the delete all of the objects 15 of the delete domain name 14 of the data contents from the synchronized objects 15 already in existence for the bundle 13 (losing membership of the delete domain name 14). As mentioned, the mention of the delete domain name 14 in the transaction log 42 would be assigned a new ID (e.g. domain name ID, new bundle ID 8 if appropriate) to replace the current ID (e.g. delete current bundle ID 8 if appropriate) of the delete domain name 14 in the transaction log 42, thereby reflecting the loss in bundle 13 membership of the delete domain name 14. It is recognised that in the case of deleting the delete domain name 14 from the bundle 13, all of the objects for the delete domain name 14 would be duplicated in the registry and assigned appropriate data contents to reflect loss of membership in the old bundle 13. It is feasible that some of the object 15 types may remain populated by data as inherited when first incorporated into the old bundle 13, for example the delete domain name 14 can retain its creation date (creation data object 15 type) of the rest of the pre-existing domain names 14 of the bundle 13 or for example the delete domain name 14 can retain its renewal date (renewal data object 15 type) of the rest of the pre-existing domain names 14 of the bundle 13. However, irrespective that some of the object 15 types can remain similar to the domain names 14 of the old bundle 13, the owner (owner object 15 type) and contact details (registrant contact detail object 15 type) would be changed for the associated objects 15 of the delete domain name 14. It is recognised as well that the list 9 of domain names 14 would be updated with the loss of the delete domain name ID and the delete domain name 14 would lose the bundle ID 8 of the old bundle 13 to reflect change in bundle 13 membership.

An example operation of the command module 36 is as follows, referring to FIGS. 1 and 2, synchronizing management of a plurality of domain names 14 in a Domain Name System (DNS) can be implemented by the registry operator 20 and/or registry services provider 22 by: receiving a management request 35 from a domain name registrant 12 for an action as a maintenance operation on an object 15 unique to a domain name 14 of the DNS, the domain name 14 having synchronized objects 15 with another domain name 14 being stored as a domain name bundle 13 including the domain name 14 in a domain name database 18; changing the object 15 by the command module 36 in the domain name database 18 according to the action; identifying the another domain name 14 in the domain name bundle 13 by inspecting a list of domain names contained in the bundle 13; requesting a change to a corresponding object 15 to the object 15 for the another domain name 14 with the action in order to propagate the registration operation performed on the object 15 to the corresponding object 15, the corresponding object 15 being unique to the another domain name 14; and forwarding a reported result 34 of the action to the domain name registrant 12, the object 15 and the corresponding object 15 representing the synchronized objects 15 by having the same parameter value, an owner to all domain names 14 in the domain name bundle 13 being the domain name registrant 12.

A further example operation of the command module 36 is as follows, referring to FIGS. 1 and 2: receiving a subsequent request 35 from the domain name registrant 12 for a subsequent action as a subsequent maintenance operation on the object 15 unique to the domain name 14 of the DNS; changing the object 15 in the domain name database 18 according to the subsequent action; identifying the another domain name 14 in the domain name bundle 13; requesting a subsequent change to the corresponding object 15 for the another domain name 14 with the subsequent action in order to propagate the subsequent registration operation performed on the object 15 to the corresponding object 15; and forwarding a reported result 34 of the subsequent action to the domain name registrant 12.

A further example operation of the command module 36 is as follows, referring to FIGS. 1 and 2: receive a subsequent request 35 from the domain name registrant 12 for a subsequent action as a subsequent maintenance operation on a different object 15 unique to the domain name 14 of the DNS; changing the different object 15 in the domain name database 18 according to the subsequent action; identifying the another domain name 14 in the domain name bundle 13; requesting a subsequent change to the corresponding different object 15 for the another domain name 14 with the subsequent action in order to propagate the subsequent maintenance operation performed on the different object 15 to the corresponding different object 15; and forwarding a reported result 34 of the subsequent action to the domain name registrant 12.

A further example operation of the command module 36 is as follows, referring to FIGS. 1 and 2: receiving a subsequent request 35 from the domain name registrant 12 for a subsequent action as a subsequent maintenance operation on the corresponding object 15 unique to the another domain name 14 of the DNS; changing the corresponding object 15 in the domain name database 18 according to the subsequent action; identifying the domain name 14 in the domain name bundle 13; requesting a subsequent change to the object 15 for the domain name 14 with the subsequent action in order to propagate the subsequent operation performed on the corresponding object 15 to the object 15; and forwarding a reported result 34 of the subsequent action to the domain name registrant 12.

A further example operation of the command module 36 is as follows, referring to FIGS. 1 and 2: receiving a subsequent request 35 from the domain name registrant 12 for a subsequent action as a subsequent maintenance operation on a different corresponding object 15 unique to the another domain name 14 of the DNS; changing the corresponding different object 15 in the domain name database 18 according to the subsequent action; identifying the domain name 14 in the domain name bundle 13; requesting a subsequent change to a different object 15 for the domain name 14 with the subsequent action in order to propagate the subsequent operation performed on the corresponding different object 15 to the different object 15; and forwarding a reported result 34 of the subsequent action to the domain name registrant 12.

It is recognised that one of the maintenance operations could be updating the objects 15 in the object set to reflect a change in registrar 14 of the bundle 13 and all domain names 14 contained therein.

The action can be implementing actions on all domain names 14 of the domain name bundle 13 owned by the domain name registrant 12, for example actions such as check, info/status, update/mod, delete/del, transfer, renew. It is recognised that all domain names 14 of the domain name bundle 13 can be stored in the domain name database 18 of a common registry 20. It is recognised that all domain names 14 of the domain name bundle 13 can be associated with a common registrar 16. Further, the forwarded result 34 can include details on the synchronized objects 15 for the domain name 14 and the another domain name 14.

Further, it is recognized that any of the domain names 14 of the bundle 13 can be identified in the request 32,35 in order to affect all domain names 14 in the bundle 13.

In view of the above descriptions of storage 18 for the computer devices 100 (see FIG. 3) of registry operator 20 and service 22, storage 18 can be configured as keeping the stored data (e.g. objects 15, lists 8,9) in order and the principal (or only) operations on the stored data are the addition/amendment of or removal of the stored data from storage 18 (e.g. FIFO, FIAO, etc.). For example, storage 18 can be a linear data structure for containing and subsequent accessing of the stored data and/or can be a non-linear data structure for containing and subsequent accessing of the stored data.

Further, storage 18 receives various entities such as data that are stored and held to be processed later. In these contexts, storage 18 can perform the function of a buffer, which is a region of memory used to temporarily hold data while it is being moved from one place to another (i.e. between the between computer devices 100). Typically, the data is stored in the memory when moving the data between processes within/between one or more computers. It is recognised that storage 18 can be implemented in hardware, software, or a combination thereof. The storage 18 is used in the network system 10 when there is a difference between the rate/time at which data is received and the rate/time at which the data can be processed (e.g. ultimately by the devices 100).

Further, it will be understood by a person skilled in the art that memory/storage 18 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 18 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 18 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 18 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server (acting as a client or as a server of a classic client-server relationship), it is recognised that the computer devices 100 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 11. The computer devices 100 implementing functionality of registry operator 20 and service 22 can provide specialized services across the network 11, for example to private users inside a large organization or to public users via the Internet 11. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 11 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Figure 3:
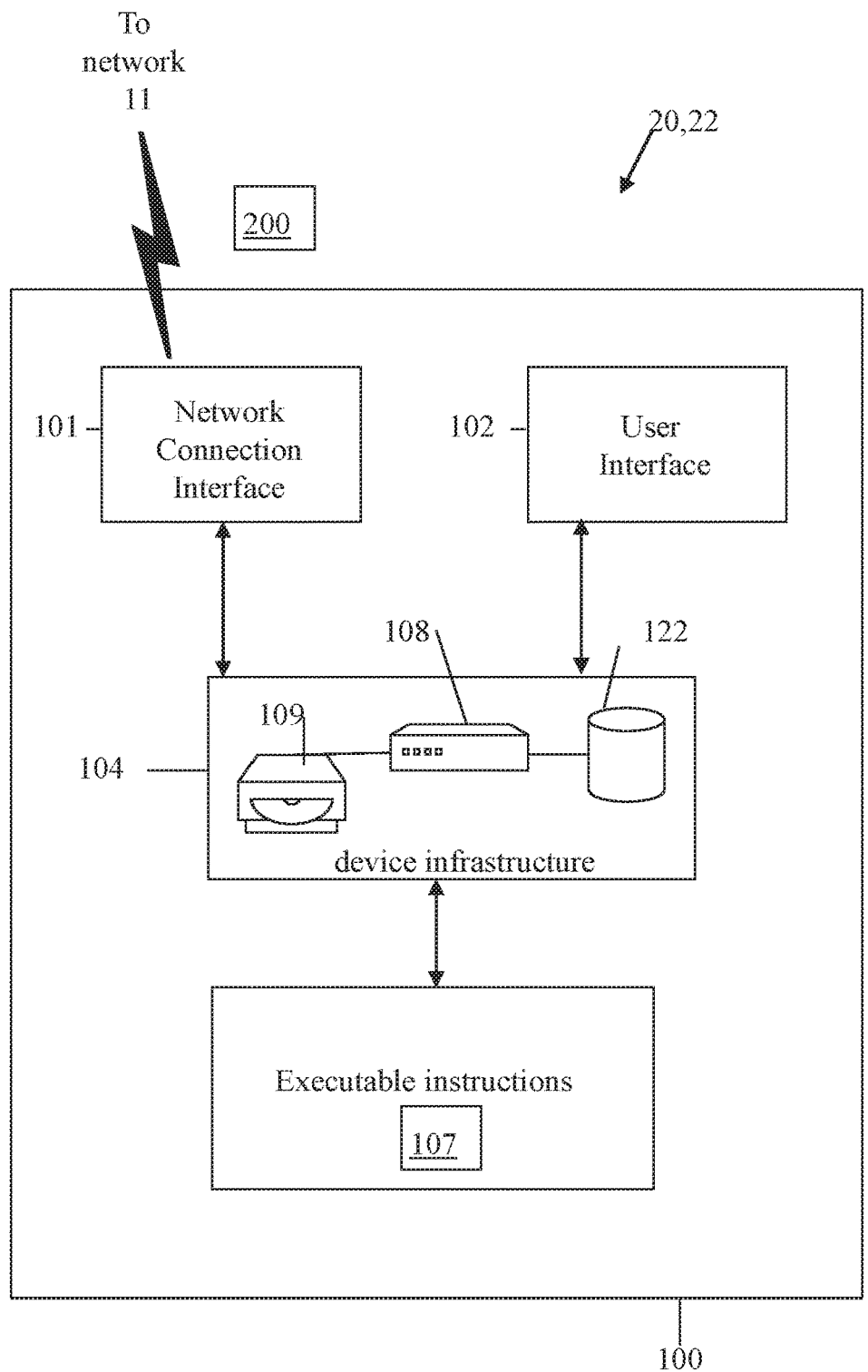
FIG. 3 is an example configuration of a computer device hosting the client or server devices utilized in FIG. 2.

Referring to FIG. 3, a computing device 100 implementing functionality of registry operator 20 and service 22 can include a network connection interface 101, such as a network interface card or a modem, coupled via connection 118 to a device infrastructure 104. The connection interface 101 is connectable during operation of the devices to the network 11 (e.g. an intranet and/or an extranet such as the Internet), which enables the devices to communicate with each other as appropriate. The network 11 can support the communication of the communications 20, 26, 32, 34, 35, and the related content.

Referring again to FIG. 3, the device 100 can also have a user interface 102, coupled to the device infrastructure 104, to interact with a user (e.g. server administrator—not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 3, operation of the device 100 is facilitated by the device infrastructure 104. The device infrastructure 104 includes one or more computer processors 108 and can include an associated memory 122 (e.g. memory 18). The computer processor 108 facilitates performance of the device 100 configured for the intended task (e.g. of the respective module(s) 30,36,40 of service 22, operator 20) through operation of the network interface 101, the user interface 102 and other application programs/hardware of the device 100 by executing task related instructions. These task related instructions can be provided by an operating system, and/or software applications located in the memory 122, and/or by operability that is configured into the electronic/digital circuitry of the processor(s) 108 designed to perform the specific task(s). Further, it is recognized that the device infrastructure 104 can include a computer readable storage medium 109 coupled to the processor 108 for providing instructions to the processor 108 and/or to load/update the instructions 107 (e.g. modules 30,36,40). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 100 can include the executable applications comprising code or machine readable instructions for implementing predetermined functions/operations including those of an operating system and the modules, for example. The processor 108 as used herein is a configured device and/or set of machine-readable instructions for performing operations as described by example above, including those operations as performed by any or all of the modules 30,36,40. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the modules may be implemented in hardware, software or a combination of both. Accordingly, the use of a processor 108 as a device and/or as a set of machine-readable instructions is hereafter referred to generically as a processor/module for sake of simplicity. Further, it is recognised that the service 22 and/or operator 20 can include one or more of the computing devices 100 (comprising hardware and/or software) for implementing the modules, as desired.

It will be understood in view of the above that the computing devices 100 may be, although depicted as a single computer system, may be implemented as a network of computer processors, as desired.

What is claimed is:

1. A method for synchronizing management of a plurality of domain names in a Domain Name System (DNS), which comprises:
   receiving a single request for an action as an operation on an object unique to a domain name of the DNS, the domain name having synchronized objects with another domain name being stored as a domain name bundle including the domain name in a domain name database;
   requesting a change to the object in the domain name database according to the action obtained from the single request;
   identifying the another domain name in the domain name bundle, both the domain name and the another domain name being associated with the domain name bundle;
   requesting a change to a corresponding object to the object for the another domain name with the action obtained from the single request in order to propagate the operation performed on the object to the corresponding object, the corresponding object being unique to the another domain name; and
   forwarding a reported result of the action, the object and the corresponding object representing the synchronized objects by having a same parameter value;
   wherein each of the domain name and the another domain name have a same bundle ID associated with the domain name bundle itself;
   wherein the same bundle ID is contained in a transaction log containing a plurality of previous operations executed on the object of the domain name and the corresponding object of the another domain name of the domain name bundle;
   wherein the same bundle ID contained in the transaction log is associated with the domain name, such that the same bundle ID represents a new bundle ID of the domain name bundle representing a change in bundle membership of the domain name.

2. The method of claim 1, wherein the domain name and the another domain name are configured as having a constant parent label with a varying child label.

3. The method of claim 2, wherein the action is from a provisioning protocol.

4. The method of claim 2, wherein the action is assigning the all domain names of the domain name bundle to a domain name registrant.

5. The method of claim 1, wherein the synchronized objects include objects selected from the group consisting of: domain name; creation date; expiration date; registrant contact data; host name and name server name.

6. The method of claim 1, wherein the domain name and the another domain name are configured as having a varying parent label with a constant child label.

7. The method of claim 1, wherein said all domain names of the domain name bundle are stored in the domain name database of a common registry.

8. The method of claim 1, wherein said all domain names of the domain name bundle are associated with a common registrar.

9. The method of claim 1, wherein the forwarded result includes details on the synchronized objects for the domain name and the another domain name.

10. The method of claim 1, wherein the domain name bundle contains a plurality of domain names including the domain name and the another domain name.

11. The method of claim 1, wherein the domain name bundle is associated with a first registrar and a second domain name bundle in the domain name database is associated with a second registrar different from the first registrar.

12. The method of claim 1, which further comprises:
receiving a subsequent single request for a subsequent action as a subsequent operation on the object unique to the domain name of the DNS, the subsequent action obtained from the subsequent single request;
requesting a subsequent change to the object in the domain name database according to the subsequent action obtained from the subsequent single request;
identifying the another domain name in the domain name bundle;
requesting a subsequent change to the corresponding object for the another domain name with the subsequent action in order to propagate the subsequent operation obtained from the subsequent single request and performed on the object to the corresponding object; and
forwarding a reported result of the subsequent action.

13. The method of claim 12, wherein the operation is create or add for both the domain name and the another domain name and the subsequent operation is delete or del for both the domain name and the another domain name, such that only the domain name is specified in the subsequent request.

14. The method of claim 12, wherein the operation is create or add of both the domain name and the another domain name and the subsequent operation is transfer of both the domain name and the another domain name.

15. The method of claim 12, wherein the operation is create or add of both the domain name and the another domain name and the subsequent operation is renew of both the domain name and the another domain name.

16. The method of claim 1, which further comprises:
receiving a subsequent request for a subsequent action as a subsequent operation on a different object unique to the domain name of the DNS;
changing the different object in the domain name database according to the subsequent action;
identifying the another domain name in the domain name bundle;
requesting a subsequent change to the corresponding different object for the another domain name with the subsequent action in order to propagate the subsequent operation performed on the different object to the corresponding different object; and
forwarding a reported result of the subsequent action.

17. The method of claim 16, wherein the operation is create or add for both the domain name and the another domain name and the subsequent operation is check for both the domain name and the another domain name, such that only the domain name is specified in the subsequent request.

18. The method of claim 16, wherein the operation is create or add for both the domain name and the another domain name and the subsequent operation is update or mod for both the domain name and the another domain name, such that only the domain name is specified in the subsequent request.

19. The method of claim 16, wherein the different object and the corresponding different object contain contact details of the domain name registrant.

20. The method of claim 1, which further comprises:
receiving a subsequent request for a subsequent action as a subsequent operation on the corresponding object unique to the another domain name of the DNS;
changing the corresponding object in the domain name database according to the subsequent action;
identifying the domain name in the domain name bundle;
requesting a subsequent change to the object for the domain name with the subsequent action in order to propagate the subsequent operation performed on the corresponding object to the object; and
forwarding a reported result of the subsequent action.

21. The method of claim 1, which further comprises:
receiving a subsequent request for a subsequent action as a subsequent operation on a different corresponding object unique to the another domain name of the DNS;
changing the corresponding different object in the domain name database according to the subsequent action;
identifying the domain name in the domain name bundle;
requesting a subsequent change to a different object for the domain name with the subsequent action in order to propagate the subsequent operation performed on the corresponding different object to the different object; and
forwarding a reported result of the subsequent action.

22. The method of claim 1, wherein each of the domain name and the another domain name have a same bundle ID associated with the domain name bundle itself.

23. The method of claim 22, wherein the change to the object and the change to the corresponding object in view of said same bundle ID results in changes to data contents of the object being mapped to changes to data contents of the corresponding object based on the single request.

24. The method of claim 22 further comprising: obtaining a list of domain names contained in the domain name bundle, the domain name bundle associated with the domain name; wherein said identifying the another domain name is performed by inspecting the list.

25. The method of claim 24, wherein said requesting a change to the another domain name based on said identifying the another domain name in the domain name bundle, such that the domain name bundle includes the domain name.

26. The method of claim 24, wherein the domain name bundle in not included in the single request.

27. The method of claim 22, wherein the same bundle ID is contained in a transaction log pertaining to the domain name bundle, the transaction log containing a plurality of previous operations executed on the object of the domain name and the corresponding object of the another domain name of the domain name bundle.

28. The method of claim 27 further comprising a plurality of bundle IDs contained in the transaction log including the same bundle ID and a previous domain name bundle ID contained in the transaction log and associated with the domain name, such that the previous domain name bundle ID represents a previous domain name bundle of the domain name, the previous domain name bundle ID representing a change in bundle membership of the domain name.

29. The method of claim 1, wherein the domain name also has at least one unsynchronized object with the another domain name, the at least one unsynchronized object not including an owner object type and a registrant contact detail object type.

30. The method of claim 29, wherein the at least one unsynchronized object is a creation date object type.

31. The method of claim 29, wherein the at least one unsynchronized object is a renewal date object type.

32. The method of claim 1, the object being at least one of a registration object, a contact object, a nameserver object or a domain object specified in the DNS and the action being at least one of check, status, update, delete, transfer or renew.

33. A method for synchronizing management of a plurality of domain names in a Domain Name System (DNS), which comprises:
   providing a domain name having synchronized objects with other domain names being stored as a domain name bundle including the domain name;
   adding a new domain name to the domain name bundle;
   associating a new domain name ID in a transaction log to the new domain name, the transaction log containing a plurality of previous operations executed on one or more objects of the domain name and the corresponding one or more objects of the other domain names of the domain name bundle; and
   associating an original domain name ID of the new domain name in the transaction log to the new domain name, the original domain name ID representing identification of the new domain name before the new domain name being added to the domain name bundle;
   wherein the new domain name ID is cross referenced to the original domain name ID.

34. The method of claim 33, wherein the domain name also has at least one unsynchronized object with the other domain names, the at least one unsynchronized object not including an owner object type and a registrant contact detail object type.

35. The method of claim 34, wherein the at least one unsynchronized object is a creation date object type.

36. The method of claim 34, wherein the at least one unsynchronized object is a renewal date object type.

37. A method for synchronizing management of a plurality of domain names in a Domain Name System (DNS), which comprises:
   providing a domain name having synchronized objects with other domain names being stored as a domain name bundle including the domain name;
   deleting the domain name from the domain name bundle;
   associating a new domain name ID of the domain name to a mention of the domain name in a transaction log, the mention representing a loss of membership in the domain name bundle of the domain name, the transaction log containing a plurality of previous operations executed on one or more objects of the domain name; and
   associating a first domain name ID in the transaction log to the mention, the first domain name ID representing identification of the domain name before deletion of the domain name from the domain name bundle;
   wherein the new domain name ID is cross referenced to the first domain name ID.

* * * * *